Oct. 2, 1951  J. E. DUBE ET AL  2,569,751
THREE-WAY VALVE
Filed April 21, 1945
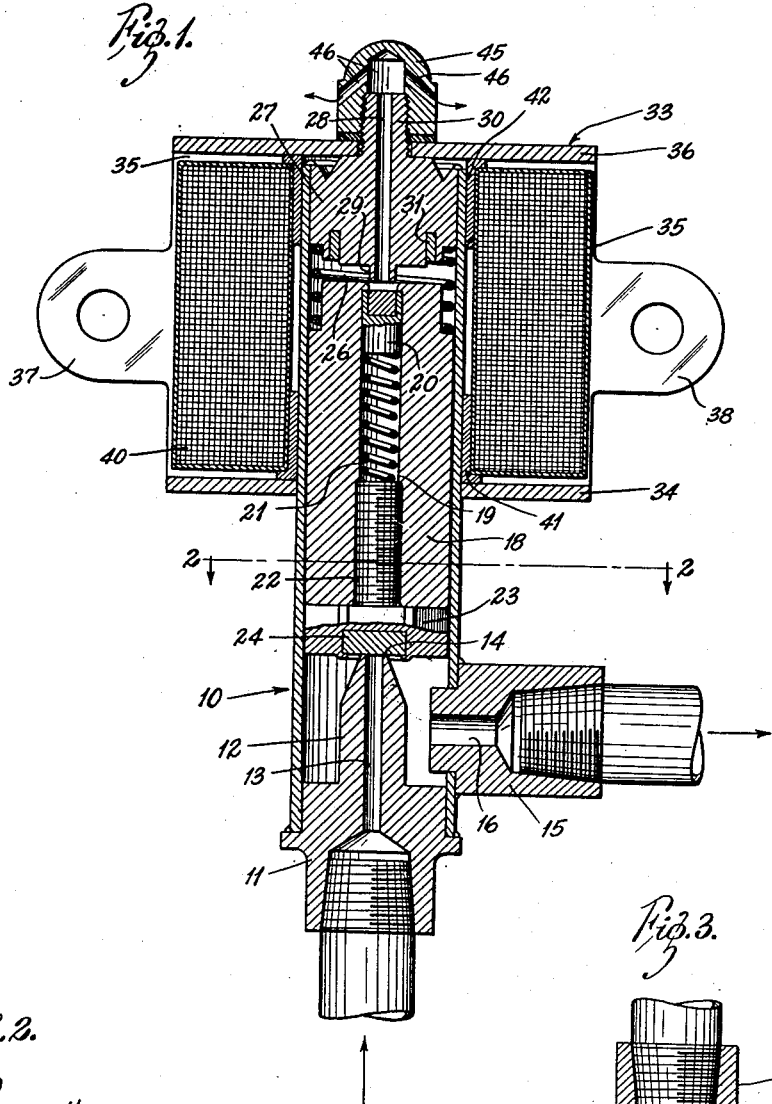
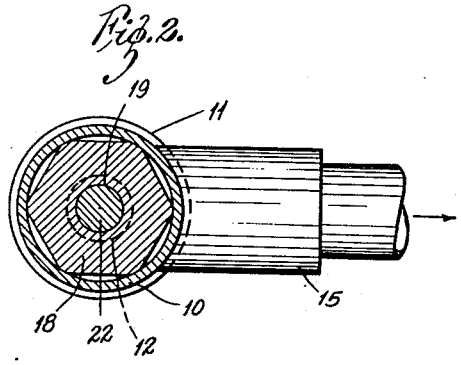
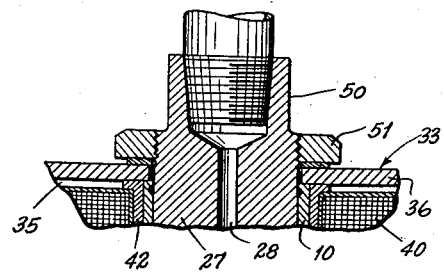
INVENTORS:
JOHN E. DUBE,
EVAN JONES,
BY Kingsland Rogner Ezell
ATTORNEYS.

Patented Oct. 2, 1951

2,569,751

UNITED STATES PATENT OFFICE 2,569,751

THREE-WAY VALVE

John E. Dube and Evan Jones, St. Louis County, Mo., assignors to Alco Valve Company, University City, Mo., a corporation of Missouri Application April 21, 1945, Serial No. 589,622

7 Claims. (Cl. 137—144)

The present invention relates to a three-way valve, especially one of the magnetic type which connects one outlet alternately to one or the other of two additional outlets.

It is an object of the invention to provide a magnetic valve having a magnetic core movable from a first position to a second position, with a valve means at each end of the core operated by movement of the core. A further object is to provide a magnetic armature with a valve means at each end thereof with one of the valve means movable relative to the armature.

A further object is to provide a magnetic three-way valve having a valve housing in the form of a tube, with a ported plug at each end thereof, a coil therearound, an armature moved from plug to plug to close one or the other of the ports, and a lateral opening through one wall of the housing.

Fig. 1 is a vertical sectional view through a magnetic valve of this kind;

Fig. 2 is a section on the line 2—2 of Fig. 1; and

Fig. 3 is a fragmentary section of a modification of the upper port construction.

In the drawings, a valve housing 10 is formed preferably as a tube. An inlet plug 11 is sealed into the bottom of the tube. It has an upstanding projection 12 thereon with a passage 13 therethrough, terminating in a valve seat 14. The tube also has an outlet plug 15 sealed into an opening in the lower side wall thereof, the plug 15 having an outlet passage 16 therethrough.

Within the tube there is an armature member 18 of magnetic material, hexagonal in cross section, as shown in Fig. 2, to provide space for gas flow therearound. This armature member 18 has a bore 19 therethrough. This bore receives therein a valve plug 20, and is flanged over at the top to limit the upward movement of the valve plug 20. A coil spring 21 within the opening 19 normally urges the valve plug 20 upward. The spring is confined by a threaded screw 22 formed on a head 23, which is thus secured to the armature member 18. The head 23 contains a valve washer element 24 adapted to seat against the valve seat 14 on the inlet plug 11.

The armature 18 is urged downwardly by a coil spring 26 that is confined between a shoulder on the armature member 18 and a shoulder on a top outlet plug 27. This top plug is sealed into the top of the tube 10. It has a passage 28 therethrough, the lower end of which extends through a valve seat forming projection 29 and the upper end of which passes through a threaded projection 30. The valve seat projection 29 is small enough to pass through the opening of the bore 19 and the armature 18 and to seat against the washer of the valve plug 20. The plug 27 may also have a shading ring 31 to avoid chattering.

The tube is adapted to be inserted upwardly through a magnetic bracket 33 which has a bottom wall 34, a black wall 35, and a top wall 36. The back wall has fastening brackets 37 and 38 thereon.

The lower wall 34 has an opening of a size to receive a tube 10, and the upper wall 36 has an opening of a size to receive the threaded projection 30.

Prior to assembly of the tube 10 and associated parts into the bracket, a magnetic coil 40, of a shape to fit within the bracket and to surround the tube 10, has two sleeves 41 and 42 inserted into the bottom and top of the core opening therethrough. With these sleeves in place, the coil 40 is inserted between the bottom and top walls 34 and 36 of the bracket 33 to dispose the opening of the core in line with the openings in the bracket. Thereupon, the tubular member 18 may be slipped upwardly through the openings of the bracket until the projection 30 extends through the top wall 36. Then a nut 45 is threaded onto the projection 30. This nut has passages 46 exhausting to atmosphere and disposed in communication with the port 28 through the plug 27.

In Fig. 3, a modification is shown wherein the top plug 27 is provided with a projecting outlet 50 threaded to be connected to a fluid line. The plug is attached to the tubular member 10 by soldering or the like, and for additional security may fit within a somewhat enlarged cut-out at the top of the tubular member, as shown. A lock nut 51 engages on the plug 27 outside the upper flange 36 to secure the various parts in assembled relation.

Operation

When the coil is deenergized, the lower port 16 of the outlet 15 is in communication around the armature member 18 with the exhaust port 28 of the upper plug 27. The lower port 13 in the plug 11 is closed by the seating of the valve member 23 on the bottom of the armature member 18, onto the valve seat 14.

When the coil 40 is energized, it draws the armature 18 upwardly against the spring 26. This action opens the valve member 23 but almost immediately closes the valve plug 20 against the valve seat 29. The upward movement does not stop until the armature 18 strikes the plug 27. The valve plug 20 reaches the valve seat 29 at an earlier point, but the over-travel of the armature is permitted by the compression of the spring 21.

With the construction of Fig. 3, the two valves may be used to selectively connect fluid lines from the ports 13 or 28 with the port 16.

What is claimed is:

1. In a valve construction, a valve housing, having a pair of valve seats spaced from each other, a magnetic coil around the housing adjacent the seats, an armature member within the housing, a passage through the armature member, a first valve slidably engaged within said passage axially of the armature member, spring means contained within the passage urging said valve outwardly of said passage, a removable plug closing the other end of said passage, a second valve on said plug, one valve member being engageable with one valve seat when the coil is de-energized, and the other valve member being engageable with the other valve seat only when the coil is energized.

2. In a valve construction, a tubular member, a first closure closing one end of the tubular member and having a passage therethrough, a second closure closing the other end of the tubular member, projecting beyond the tubular member, having a passage therethrough, means providing a third passage into the tubular member between the closures, each closure having a valve-seat-providing projection facing inwardly, a magnetic armature within the tubular member, having a hole therethrough constricted adjacent one end, a valve plug in the hole, spring means yieldingly urging the valve plug against the constriction, said hole being adapted to receive one valve-seat projection so the same may engage the valve plug when the armature is in one position, a second valve plug having a projection threaded into the armature hole to confine the spring therein, and engageable with the other valve-seat projection when the armature is in a second position, a bracket having a lower flange and an upper flange, the lower having a hole to receive the upper closure projection, a magnetic coil supported between the flanges, around the tubular member, and holding means engaging the closure projection outside the flange to secure the parts together.

3. In a valve construction, a tubular member; a closure member at one end of the tubular member having a passage therethrough, said closure member containing an inwardly extending projection providing a valve seat at the inner end thereof; an armature within the tubular member containing a longitudinal passage therethrough, said passage being constricted at one end; a valve plug slidably mounted in the passage adjacent the constricted end; and spring means yieldingly urging the valve plug against the constriction; the opening at the constricted end of the passage being of a size to receive the projecting valve seat whereby the latter engages the valve plug so as to seal off the passage in the closure member when the armature is in one position.

4. In a valve construction, a tubular member; a closure member at one end of the tubular member having a passage therethrough, said closure member containing a valve seat at the inner end thereof; an armature slidably mounted within the tubular member and containing a longitudinal passage therethrough, said passage being constricted at one end; a valve plug slidably mounted in the passage adjacent the constricted end for engagement with the valve seat; and spring means yieldably urging the valve plug against the constriction, said constriction limiting the movement of the valve plug in one direction.

5. In a valve construction, a tubular member; a first closure member at one end of the tubular member having a passage therethrough; a second closure member at the other end of the tubular member having a passage therethrough, each closure member containing an inwardly extending projection providing a valve seat at the inner end thereof; an armature within the tubular member containing a longitudinal passage therethrough, said passage being constricted at one end; a first valve plug slidably mounted in the passage adjacent the constricted end; a second valve plug fixedly mounted in the other end of the armature passage; and spring means within the armature passage between the two valve plugs urging the first valve plug toward the constriction; the opening at the constricted end of the armature passage being of a size to receive the adjacent projecting valve seat whereby the latter engages the valve plug when the armature is in a first position; the second valve plug being engageable with the other valve seat when the armature is in a second position.

6. In a valve construction, a tubular member; a closure member at one end of the tubular member having a passage therethrough, said closure member containing a valve seat at the inner end thereof which extends beyond the end of the closure member; an armature slidably mounted within the tubular member and containing a longitudinally extending passage way providing an opening in one end thereof adjacent said valve seat; a valve plug slidably and totally contained within the passageway adjacent said one end for engagement with the valve seat; yieldable means urging the plug outwardly toward said end; and means associated with the armature limiting the outward movement of the plug relative to the armature.

7. In a valve construction, a tubular member; a closure member adjacent one end of the tubular member having a valve seat and a shoulder adjacent the inner end thereof, the valve seat extending beyond the shoulder; an armature slidably disposed within the tubular member and containing a longitudinally extending cavity in the end adjacent said valve seat, the armature being movable between a position adjacent the closure member and a position away from it; a valve plug slidably and totally contained within the cavity for engagement with the valve seat; yieldable means urging the valve plug toward the valve seat; and means on the armature at the mouth of the cavity for contact with the valve plug to limit its movement relative to the armature; the distance between the end of the armature and the shoulder of the closure member being greater than the distance between the valve seat and the valve plug when the armature is in the position away from the closure member whereby when the armature is moved toward the closure member the valve plug will contact the valve seat before the end of the armature contacts the shoulder of the closure member.

JOHN E. DUBE.
EVAN JONES.

(References on following page)

REFERENCES CITED

The following references are of record in the file of this patent:

UNITED STATES PATENTS

| Number | Name | Date |
|---|---|---|
| 211,044 | Penisch | Dec. 17, 1878 |
| 483,108 | Franke | Sept. 20, 1892 |
| 1,383,432 | Simon | July 5, 1921 |
| 1,573,192 | Raymond | Feb. 16, 1926 |
| 1,622,672 | Raymond | Mar. 29, 1927 |
| 2,267,515 | Wilcox et al. | Dec. 23, 1941 |
| 2,289,310 | Steel | July 7, 1942 |
| 2,291,599 | Ray | Aug. 4, 1942 |
| 2,311,851 | McClure | Feb. 23, 1943 |

FOREIGN PATENTS

| Number | Country | Date |
|---|---|---|
| 660,750 | Germany | June 2, 1938 |
| 688,114 | France | May 6, 1930 |